Patented July 6, 1943

2,323,479

UNITED STATES PATENT OFFICE 2,323,479

MECHANICAL VIBRATION OR OSCILLATION GENERATOR

Ray A. McCullough, Oakmont, Pa., assignor to Blaw-Knox Company, a corporation of New Jersey Application December 8, 1941, Serial No. 422,140

6 Claims. (Cl. 74—61)

This invention relates to devices for generating mechanical vibrations or oscillations and is for a mechanism of this character having a weight mounted to revolve on an axis which does not pass through its center of gravity, the vibrations or oscillations being generated by the rotation of the weight eccentrically about said axis.

Devices for generating or setting up mechanical vibrations or oscillations by the rotation of the weight, the center of gravity of which is eccentric to the axis of rotation have heretofore been used in various types of equipment where a rapid mechanical jarring, vibrating or tamping action is necessary. The present invention is for an improvement in such devices in which a satisfactory provision is made for adequately lubricating the bearings and which at the same time is of a more simple construction than devices heretofore designed for this purpose and which can be more easily assembled and in which the eccentric weight can be readily adjusted to control the amplitude of vibration.

The invention may be more fully understood by reference to the accompanying drawings, in which Figure 1 represents a longitudinal vertical section through a vibratory unit embodying my invention;

Figure 1:
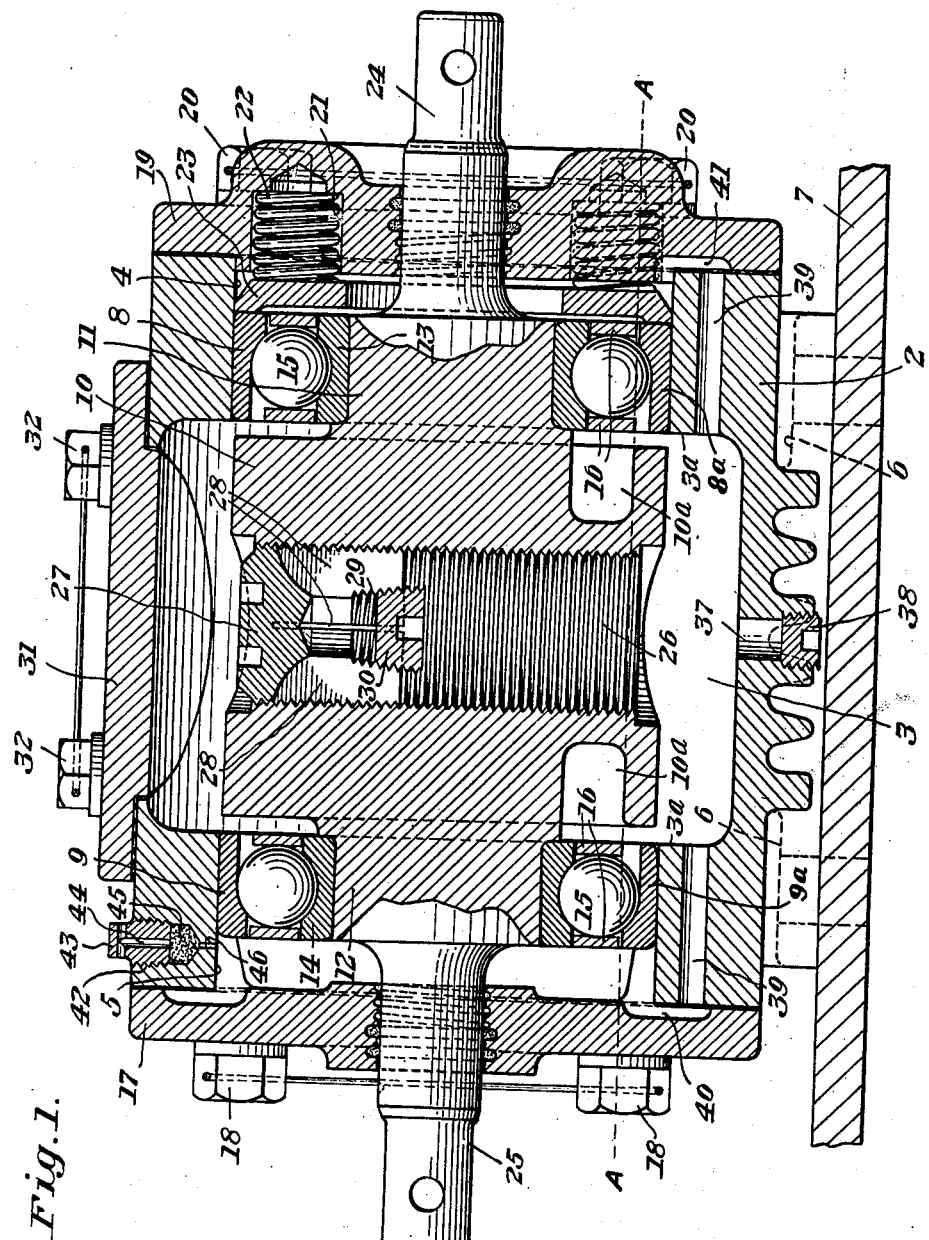

In the drawings, 2 designates a body or housing having a chamber 3 therein, there being a bore through the housing, 4 designating the bore at one side of the chamber and 5 designating the bore at the other side, the two bored portions preferably being of equal diameter. The casing is provided with integral pads or feet 6 to enable it to be set upon and bolted to the structure which is to be vibrated; this structure being represented in the drawings as a metal plate 7.

Received in the bore 4 is an outer ball race 8 and received in the bore 5 is a similar outer ball race 9. Received within the chamber 3 is an eccentrically weighted rotor 10 having extensions 11 and 12 at the opposite ends thereof. On the extension 11 is an inner-ball race 13. On the extension 12 is an inner-ball race 14. Ball bearings 15 are interposed between the races 8 and 13 and between the races 9 and 14. The numeral 16 designates the cages for the ball bearings.

Closing one end of the housing is an end plate 17 which is held in place by bolts 18. At the opposite end of the housing is an end plate 19 held in place by bolts 20. Within the end plate 19 are a number of cavities 21 in which are compression springs 22 that bear against a shoulder piece or ring 23. The shoulder piece or ring 23 in turn bears against the outer ball race 8 so that when the end plate 19 is secured in place the compression of the springs 22 against the ring 23 places an initial pressure upon the balls of the bearings at both ends of the rotor to eliminate end play and vibration in the bearings.

The rotor is shown as having a shaft portion 24 extending from one end thereof and a shaft portion 25 extending from the other end thereof. Suitably arranged oil seals in the end plates 19 and 17 serve to prevent the lubricant from escaping around the shaft extensions 24 and 25 but the extensions themselves do not have any bearing in the respective end plates. While the unit is shown as having a shaft extension at each end thereof so that it may be connected at either end with a source of power and may have the other shaft portion connected to another similar unit, it is contemplated that where the vibrator is to be used as an isolated unit the shaft extension may be eliminated from one end, in which case the end plate at such end does not require an opening.

The rotor 10 has a diameter only slightly less than the diameter of the bores 4 and 5 at each end of the housing, so that it can be inserted into the housing on either end of the housing before the outer ball races are installed, and likewise removed endwise from the housing. Preferably the rotor 10 is finished on its outer cylindrical surface, both for the purpose of making it only small enough to be inserted through the bore 4, and for the purpose of reducing friction between itself and air and oil within the casing. However, a cylindrical form of the rotor is not essential to successful operation of the device. The rotor is made with its center of gravity eccentric to the axis of rotation, preferably by coring out recesses 10a as shown in Figure 1. The rotor also is provided with a transverse bore 26 therethrough. This bore is internally threaded. Screwed into the bore is a heavy plug 27 shown in detail in Figures 3 and 4. This plug may be screwed back and forth in the hole to shift the center of gravity of the rotor and may be adjusted from the point where one end of it projects slightly beyond the periphery of the rotor to any position along the length of the hole or bore 26. In Figure 1 it is shown in a position where it is on the side of the rotor opposite the cavities 10a to thereby increase the eccentricity of the revolving weight.

Figure 3:
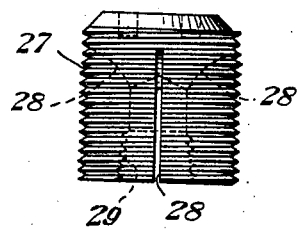
Figure 3 is an elevation of the adjustable weight.
Figure 4:
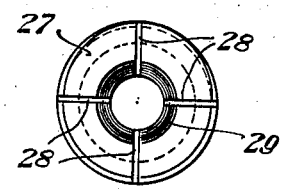
Figure 4 is a bottom view of the weight shown in Figure 3.

As shown in Figures 3 and 4 the adjustable weight 27 has several longitudinally extending slots 28 milled therein. It has a conical bore with its larger diameter at one end, into which bore is inserted a conical expander, the driving or movement of which in the conical bore tightens or loosens the plug by expanding it or permitting it to contract. I have shown the tapered bore threaded as at 29, and the expander plug as a screw plug 30. Other means for moving the plug in the bore may be substituted. By moving 30 in one direction the weight plug 27 is expanded and locked in the main bore; by moving 30 in the opposite direction, 27 is loosened. Should it become desirable at any time to change the position of the weighted block or plug 27 this can be done by loosening the expander plug 30, turning the weight 27 to the desired position and resetting the expander plug 30.

Figure 2:
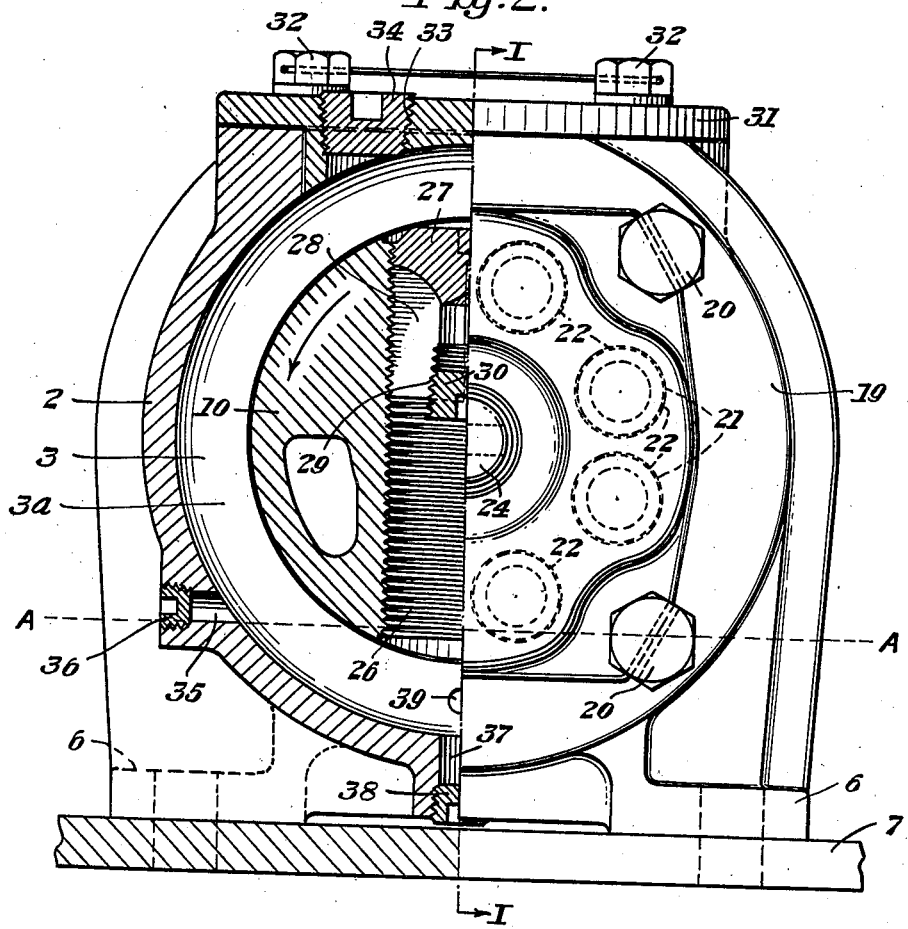
Figure 2 is a view at right angles to Figure 1, showing one half of the unit in end elevation and one half being a section in the plane of the center of the unit.

Access to the rotor for adjusting the plug 27 is afforded through a removable cover plate 31 at the top of the casing 2. This cover plate is held in place by bolts 32. As shown in Figure 2 the removable cover plate 31 is provided with an opening 33 into which is screwed a plug 34. The opening 33 is provided to enable a lubricant to be poured into the interior of the casing without removing the cover plate 31. Also, as shown in Figure 2, the casing is provided with a hole 35 in one side thereof into which is screwed a plug 36. This is provided to determine the oil level to be maintained in the chamber. In practice the lubricant is charged into the hole 33 at a time when the plug 36 is open, and when the oil starts to flow out the hole 35 the desired level and lubricant within the chamber has been established. This level is indicated by the dotted line A—A in the drawings. This level is established at an elevation such that it supplies oil to the balls in the outer races 8 and 9 of the bearings above the lips 8a and 9a which are normally present in bearings of the type shown. At the bottom of the chamber 3 is a drain hole 37 into which is screwed a plug 38.

It will be noted that the central chamber 3 is of larger diameter than the bores 4 and 5 so that at each side of the chamber there is an annular shoulder designated 3a. At the bottom of the casing 2 there are bores or holes 39, these bores 39 opening through the shoulders 3a to the outer ends of the casing 2. The plate 17 is provided with a radial channel 40 through which lubricant may flow from the space between the ball race 9 and the end plate 17 through one of the holes 39 into the lower part of the chamber 3. Likewise, a channel 41 is provided in the end plate 19 to enable lubricant to flow from the space outside the ball race 8 through the other opening 39 back into the chamber 3.

Because of the heat which is generated during the operation of the vibrator, provision is made for establishing communication between the interior of the structure and the atmosphere. This is shown in Figure 1 at the left-hand upper side of the figure where there is a well 42 into which is screwed a plug 43 having a restricted passageway 44 therein. Under this plug 43 there is a small wad of packing 45 and a small hole 46 leads from the bottom of the well to the interior of the casing. When the gases in the chamber expand due to heating, they may be forced out the hole 46 to the atmosphere and when the machine cools, air may be drawn back into the chamber. The packing 45 constitutes a filter which catches dust particles in the incoming air and prevents such particles from being drawn into the casing.

The unit as herein described provides a structure in which the rotor, except for the shaft extensions 24 and 25, is completely enclosed. Consequently, it may be used in locations where dust is prevalent with a minimum of danger of dust getting into the interior of the unit. When the device, before the rotation of the rotor, contains oil at the level indicated by the line A—A in Figure 1, oil has access to the interior of the lower races of both ball bearings and comes into contact with successive balls as the rotor is turned. Oil thus is carried, with the balls, around the races and lubricates both inner and outer races. Some of the oil finds its way through the bearings and finds its way back to the pool through 40, 41 and 39. If, as preferred, the rotor is cylindrical, it will when it is in rapid rotation carry with it a film of air which prevents intimate contact between the cylinder and the oil, the oil pool being displaced from the level position shown by the line A—A in Figure 2, in the direction of rotation; but it still effectively lubricates the bearings. The oil suffers some turbulence owing to the vibrations, and some of it is thrown against the casing. This turbulence and consequent agitation of the oil is somewhat increased if the rotor surface is rough, and if the rotor is not cylindrical. From a manufacturing standpoint the device may be easily and economically constructed. The rotor, comprising the weight, the extensions 11 and 12 and the shaft extensions 24 and 25 is constructed as an integral unit and can be inserted endwise into the housing. Once the machine has been assembled the weight 27 can be adjusted to proper operating position conveniently and easily and then locked in this adjusted position by means of the tapered plug 30.

While I have illustrated and specifically described one embodiment of my invention it will be understood that various changes and modifications are comprehended within the scope of the invention and within the contemplation of the following claims.

I claim:

1. A vibration generating apparatus comprising a housing having a bore therethrough, a rotor within the housing removable endwise through the bore and having its periphery cylindrical and concentric with the bore and of a diameter such that it will just clear the bore, bearings within the bore adjacent each end of the rotor for supporting the rotor and holding it against endwise movement, and an end member at each end of the housing closing the bore and retaining the bearings in place, said rotor having its center of gravity eccentric to its axis of rotation, the interior of the housing providing between the bearings an oil reservoir through which the periphery of the rotor revolves.

2. For use in a vibrator of the class described, a cylindrical rotor having a mid-portion the periphery of which is concentric with its axis of rotation and with an extension at each end thereof of reduced diameter to receive a bearing, said rotor having an internally threaded opening extending diametrically through it, a weight screwed into said opening, and means for adjustably holding the weight in the opening.

3. For use in a vibration generating apparatus of the class described, a rotor having a mid-portion with an extension of reduced diameter at each end thereof to receive and engage the bearing, said mid-portion of the rotor having an internally threaded opening extending diametrically through it, a weight member in the form of a slitted cylindrical body screwed into the opening, said weight member having a tapered recess therein, and an expander adjustably retained in said recess for expanding the body to releasably hold it in the position to which it is set in said opening.

4. A vibration generating apparatus comprising a housing having a bore therethrough with an enlarged central chamber between the ends thereof, a bearing in the bore at each side of the chamber, a rotor within the bore of a diameter such that it may be removed through the bore, the rotor having a mid-portion which is received within the chamber and having reduced extensions at each end thereof which engage the bearings in the bore, said rotor having its center of gravity eccentric to its axis of rotation, a removable end member at each end of the housing enclosing the bore, said end members having an oil-tight seal against the ends of the housing whereby lubricant may be retained in the housing, and means in the structure through which oil may flow from the space immediately inside the end members into the portion of the chamber under the rotor.

5. A vibration generating apparatus comprising a housing having a bore therethrough with an enlarged central chamber between the ends thereof, a bearing in the bore at each side of the chamber, a rotor within the bore of a diameter such that it may be removed through the bore, the rotor having a mid-portion which is received within the chamber and having reduced extensions at each end thereof which engage the bearings in the bore, said rotor having its center of gravity eccentric to its axis of rotation, a removable end member at each end of the housing closing the bore, said end members having an oil-tight seal against the ends of the housing, whereby lubricant may be retained in the housing, and means in the structure through which oil may flow from the space immediately inside the end members into the portion of the chamber under the rotor, said means comprising ducts extending longitudinally through the walls of the housing at each side of said chamber, the end members having channels therein which register with the outer ends of said ducts.

6. A vibration generating apparatus comprising a housing having a bore therethrough with a central chamber intermediate the two ends of the bore, a rotor within the housing having a mid-portion which is received within the chamber, the rotor having extensions at each end of the mid-portion of reduced diameter, a bearing fitted into the bore at each side of the chamber and mounted on the reduced extension of the rotor, end plates enclosing the two ends of the housing, means on the rotor providing a diametrically adjustable weight for shifting the center of gravity of the rotor with respect to its axis of rotation, said housing having a removable cover thereon through which access is afforded to said adjustable weight.

RAY A. McCULLOUGH,